March 17, 1925.
P. M. CUMMINGS
APPARATUS FOR IRRIGATING AND FERTILIZING
Filed Oct. 25, 1922
1,530,109
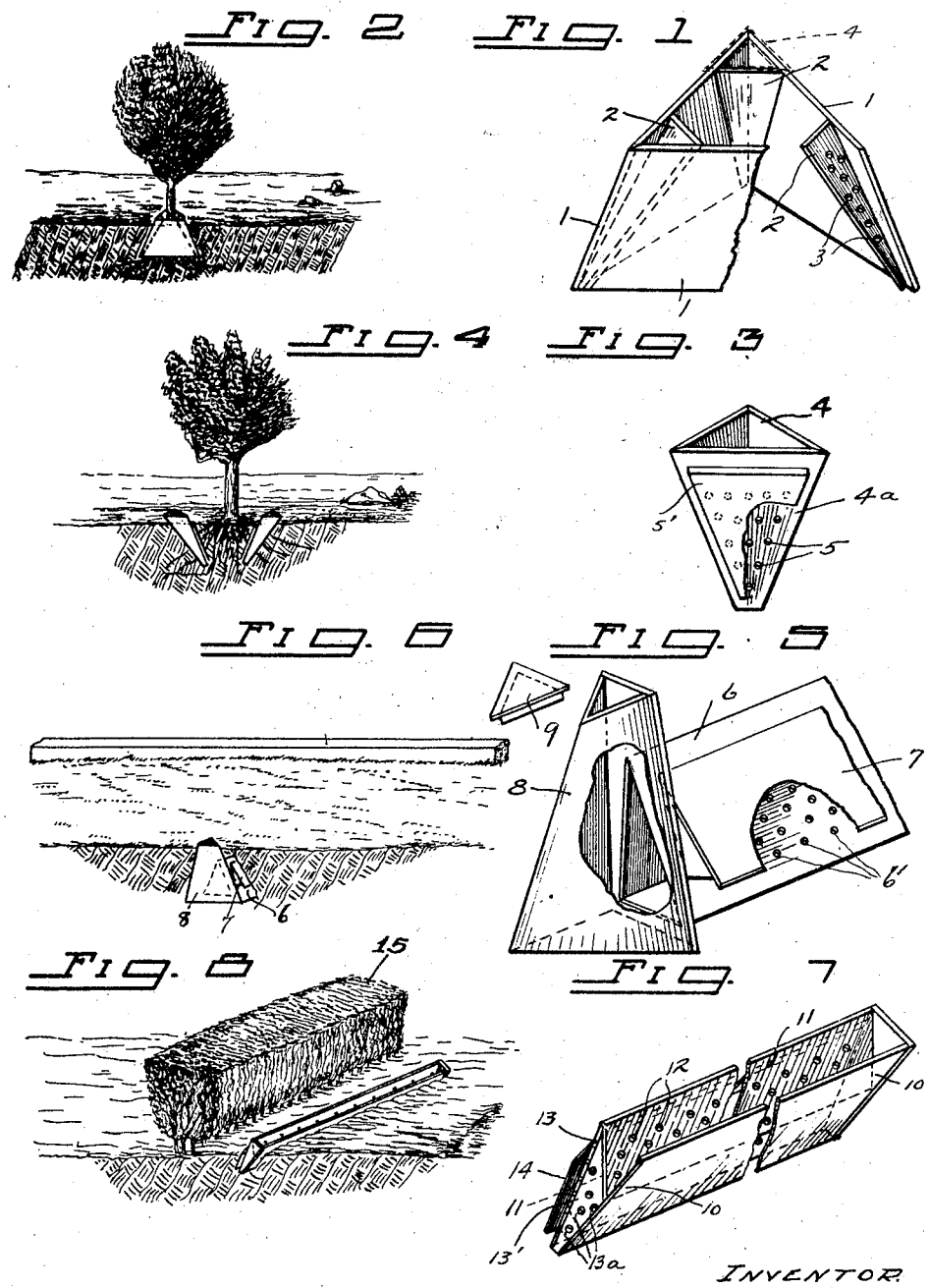

Patented Mar. 17, 1925.

1,530,109

UNITED STATES PATENT OFFICE.

PARSONS M. CUMMINGS, OF LOS ANGELES, CALIFORNIA.

APPARATUS FOR IRRIGATING AND FERTILIZING.

Application filed October 25, 1922. Serial No. 596,888.

*To all whom it may concern:*

Be it known that I, PARSONS M. CUMMINGS, a citizen of the United States, residing in the city of Los Angeles, county of Los Angeles, and State of California, have invented certain Improvements in Apparatus for Irrigating and Fertilizing, of which the following is a specification.

My invention relates to certain improvements in the art of irrigating and fertilizing the soil below the surface and without discharging water upon the surface, my method of irrigating and fertilizing being in fact sub-irrigation.

The principal object of my invention is to provide conduit members which can be extended into the ground and along under the surface of the ground, with outlet openings in their sides and at their ends, with covering portions over said openings to prevent the dirt from filling the holes or outlet openings, whereby water discharged into said conductors finds its way through said outlet openings and into the soil, below the surface, and by capillary attraction and gravity saturates the subsoil over a considerable area, thus making it possible to get the full benefit of the irrigation with no loss by evaporation.

While my water conductors, or conduits can be made of any material and various shapes and sizes, I prefer to make them of wood and in the forms which I have selected for illustrating my invention on the accompanying drawings, which I will now describe.

Figure 1 shows a single tree irrigating conductor;

Figure 2 shows it in use in connection with a tree;

Figure 3 shows a unit conductor to be inserted into the ground at the roots of a tree, at a space from the trunk of the tree;

Figure 4 illustrates this conductor in place;

Figure 5 shows a form of conduit, with conductor thereto, embodying my invention;

Figure 6 shows it in place in the ground;

Figure 7 shows a form of the invention as might be used for hedges or the like; and Figure 8 shows it in use in connection with a hedge fence.

Referring now more in detail to the drawings, I will describe my invention, or the means illustrated for putting it into practice.

Referring first to Fig. 1, I have shown a box-like structure 1, of tapering form, and triangular, with an open top and bottom, with corner pieces, 2, set in each corner, and perforated, as at 3. Cover members, 4, can be provided for the tops of the three corner conduits or conductors, as shown. This form is set into the ground so that its top is substantially flush with the surface, thus leaving the tops of the corner water conductors open, to which water is admitted. The tree is planted in the ground with the form around the lower end and roots thereof, so that when water is discharged into the corners it finds its way through the outlet openings 3, and saturates the ground around the roots, leaving the surface dry.

Referring to Figs. 3 and 4, the unit member 4, is triangular in form with its ends open, and with one or more sides perforated, as at 5, with a shield over the outlet openings to prevent dirt from filling said holes. These are set down into the ground, in the manner indicated, around the roots of a tree, and water is discharged thereinto and filters out through the soil until a large area is saturated around the roots.

In Figs. 5 and 6, I have shown an underground conduit, 6, of substantially A-form, with the sides perforated, and with a shield or guard, 7, spaced over said openings, and with an end conductor, 8, into the side of which the end of the conduit fits, as indicated. The upper end of the conductor 8, is open to receive the water and holds it until it flows through the conduit 6, and out through the outlet openings, under the guards 7. A removable cover, 9, may be provided for the top of the conductor, 8, which is substantially flush with the surface. This may be used for any sub-irrigation desired.

In Figs. 7 and 8, I have shown a slightly different form, but embodying the same principle; an outer wall member, 10, with a narrow trough member 11, perforated, as at 12, with a second outer wall member, 13, also perforated, with the guard or shield, 14, over the perforations and spaced therefrom. The water is discharged into the upper trough-like portion, 11, and runs into the chamber 13′ and out through the perforations toward the hedge 15, Fig. 8. These conduits may be made in any desired lengths and of any desired sizes. By making them of wood, the expense is not great and if of red wood, or other wood properly treated to withstand the action of the soil thereon, these conduits and conductors will last for years and simplify the matter of irrigating and save much water over the system which discharges the water in open waterways on the surface of the ground.

Another advantage of my invention as described, and that is, that fertilizing matter can be put into these water conductors and conduits and carried by the water into the ground around the roots of the trees or other growth being irrigated and fertilized; thus the fertilizer is not wasted but conducted to the place where it will perform its function of enriching the soil.

Thus I have provided a simple, economical and practical means and method of irrigating to great advantage and with a minimum of work after the conduits and conductors have been put into place, and while I have illustrated several embodiments of my invention, I am aware that many changes can be made therein without departing from the spirit thereof, and I do not limit the invention to the showing made, except as I may be limited by the hereto appended claims.

I claim:

1. An irrigating and fertilizing system including a trough like water carrier the two sides of which are joined at an angle, one of said sides having openings therein to permit water to run therethrough from said trough, and an outside guard member spaced from the side having the openings therein in substantially a parallel plane and attached thereto at its top above said openings, whereby water from said openings is directed downwardly and said openings are protected by said guard member.

2. An irrigating and fertilizing system including a trough like water carrier made of long pieces secured together at angles to each other, one of said members having openings through its side, a guard board over said openings on the outside of said carrier and spaced therefrom to guard said openings, and a water supply conductor for supplying water to said carrier, substantially as shown.

3. An irrigating and fertilizing system comprising water carriers made of long boards fastened together lengthwise at angles to each other to form a conduit for water, one of said boards being provided with a series of openings to permit water to flow therefrom, a guard board placed over the side having the openings therein in a parallel plane and spaced therefrom a short distance, said carrier being adapted to be set down into the ground with the space between said carrier and said guard board open at its lower side, and means for supplying water and fertilizer to said carrier, substantially as described.

Signed at Los Angeles, Los Angeles County, California, this 19th day of October, 1922.

PARSONS M. CUMMINGS.

Witnesses:
 W. R. LITZENBERG,
 MAI FIELD DOUGLAS.